No. 827,390. PATENTED JULY 31, 1906.
J. T. H. PAUL.
FILTER.
APPLICATION FILED JAN. 16, 1906.
4 SHEETS—SHEET 4.
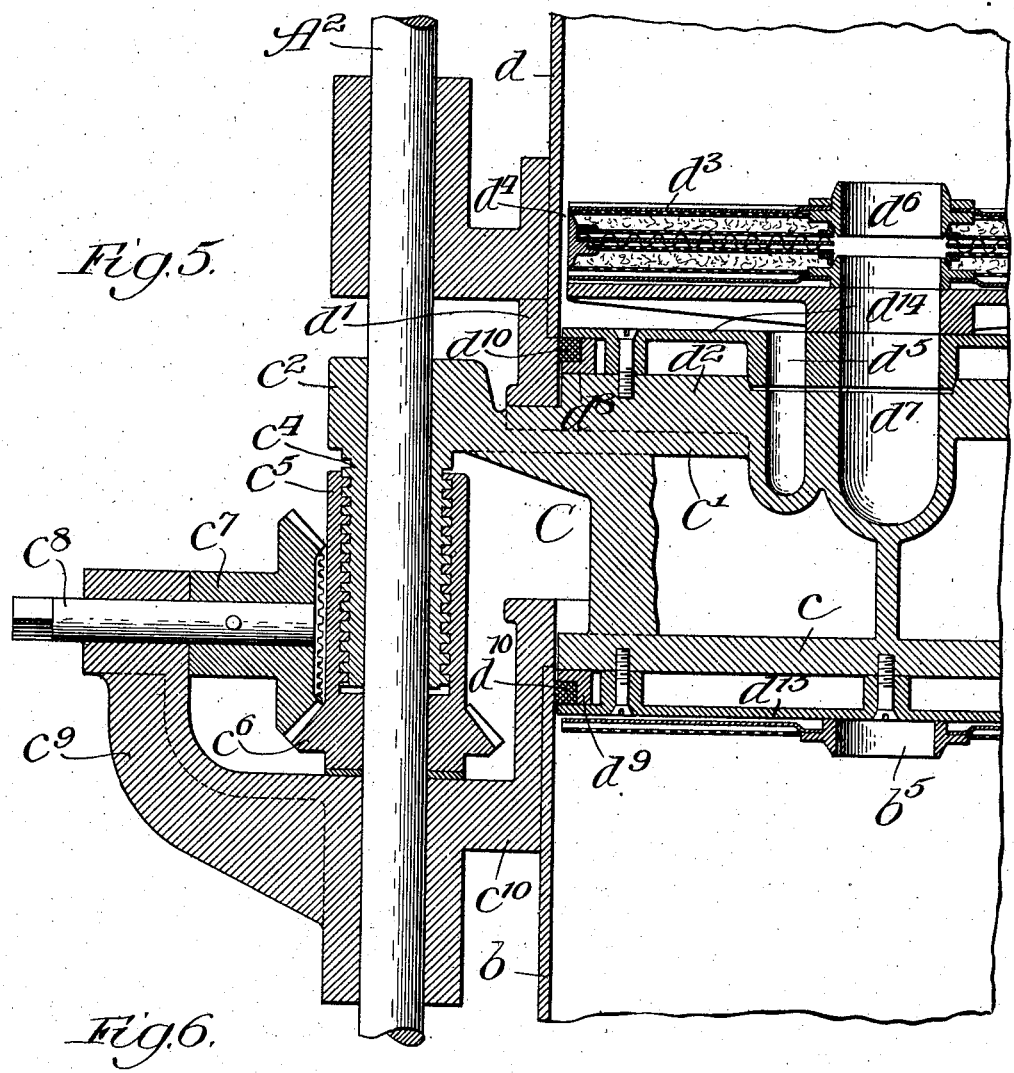
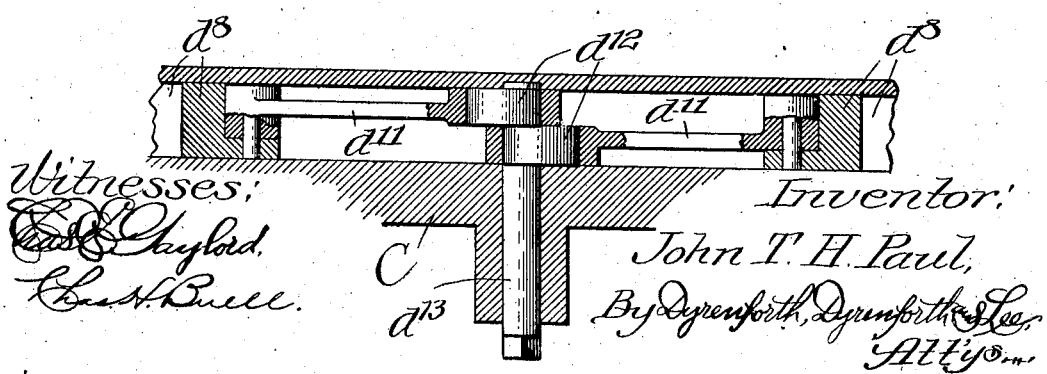
Witnesses: Inventor:
John T. H. Paul,
By Dyrenforth, Dyrenforth & Lee,
Att'ys

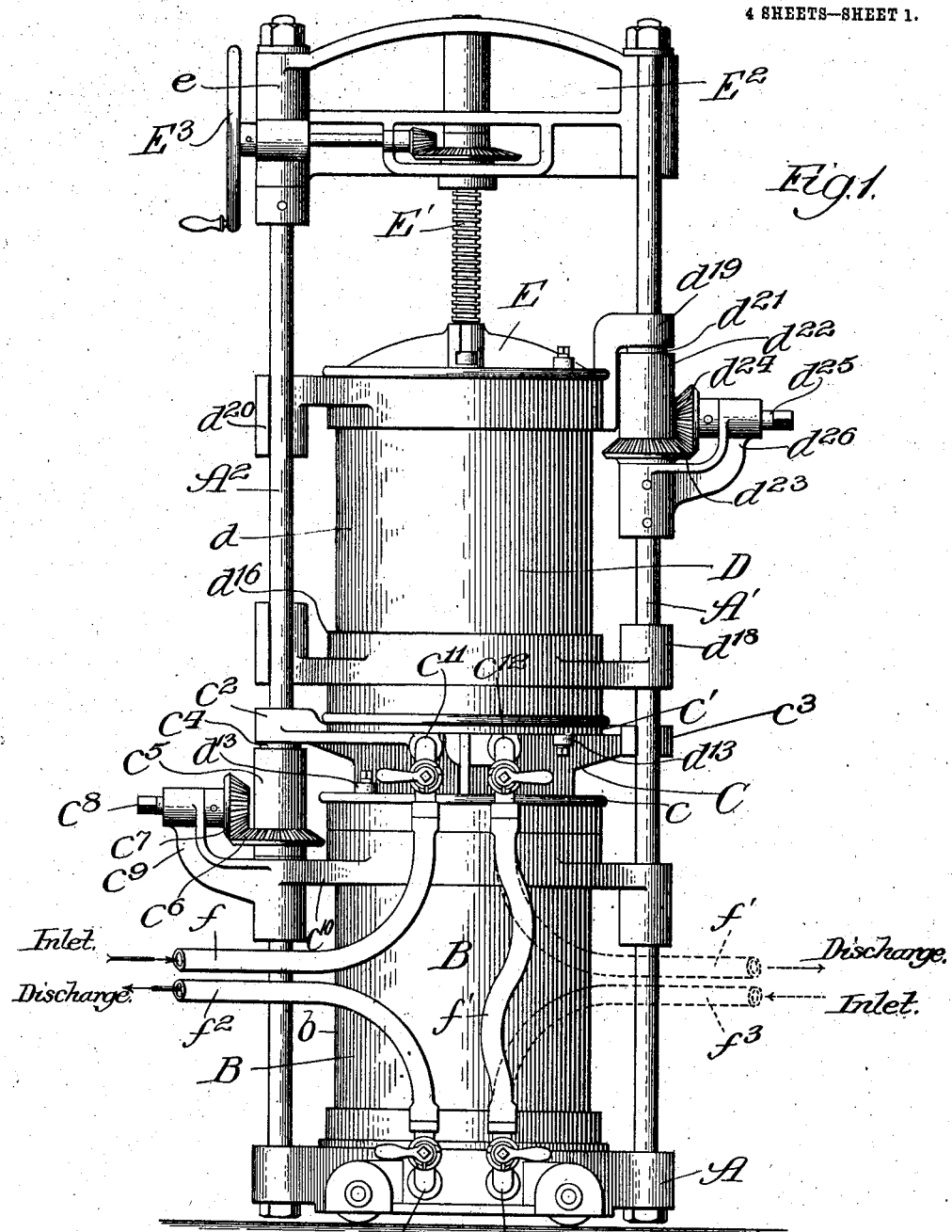

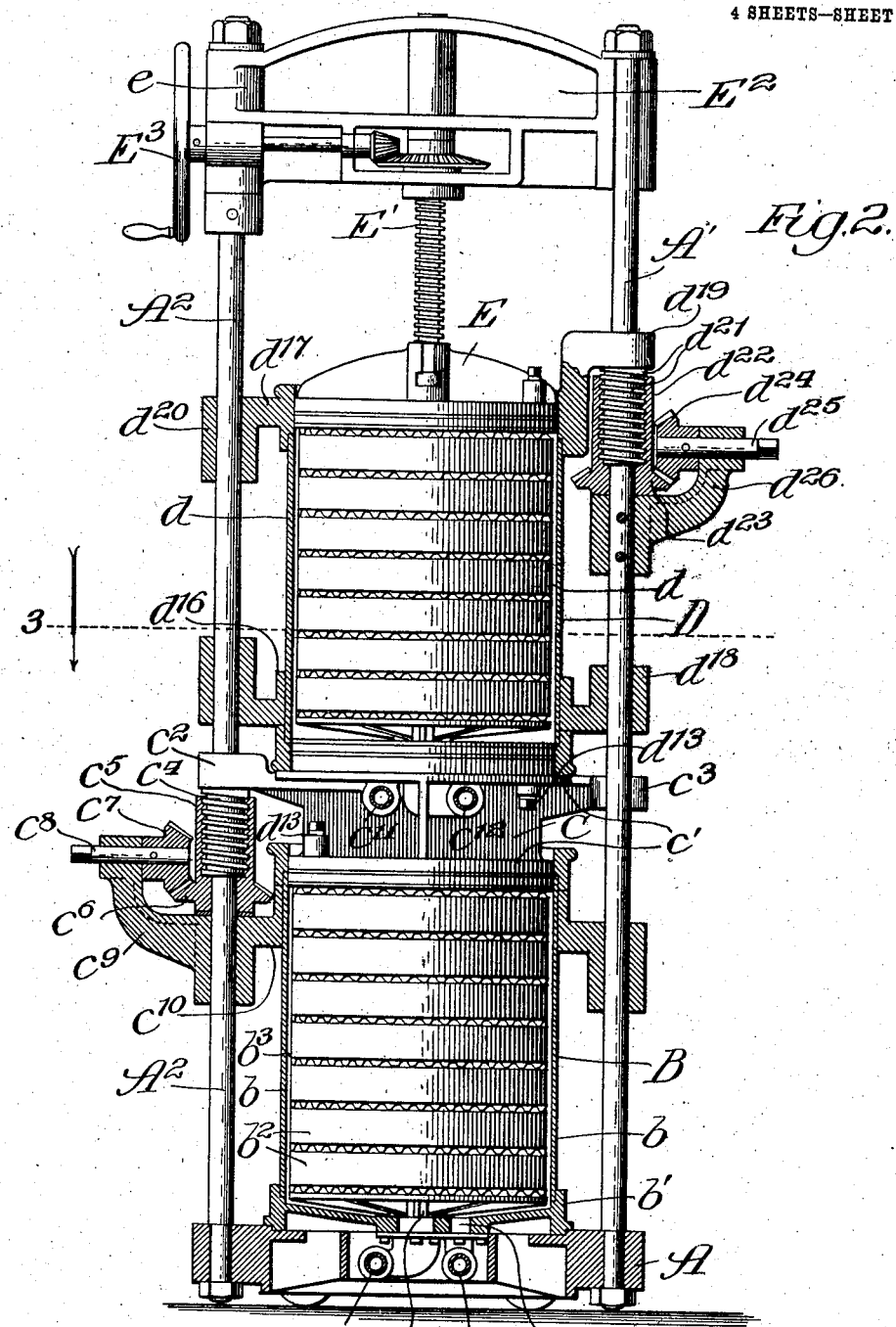

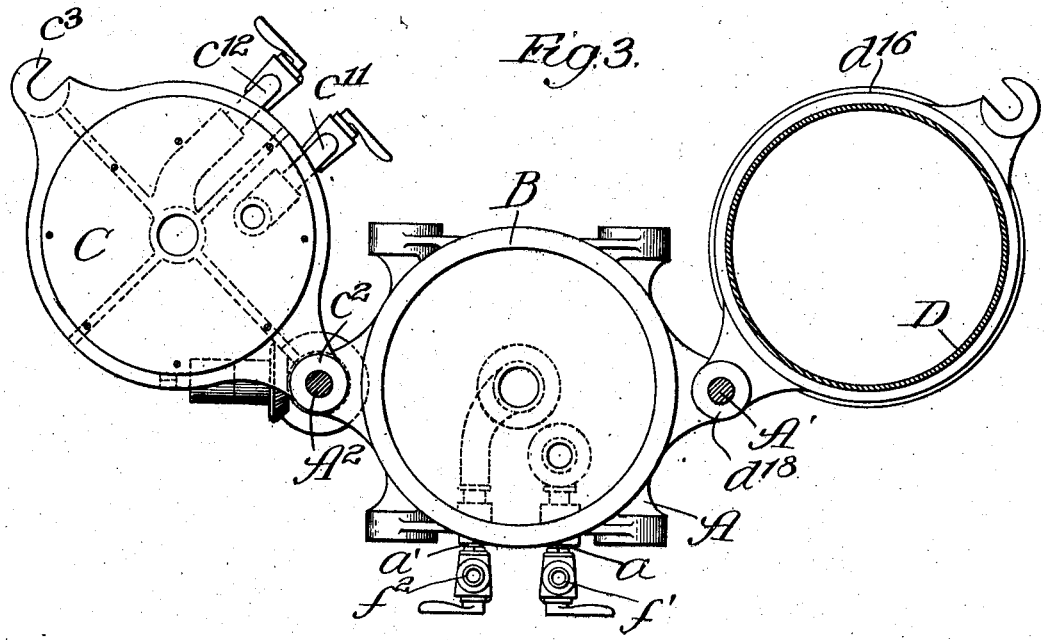
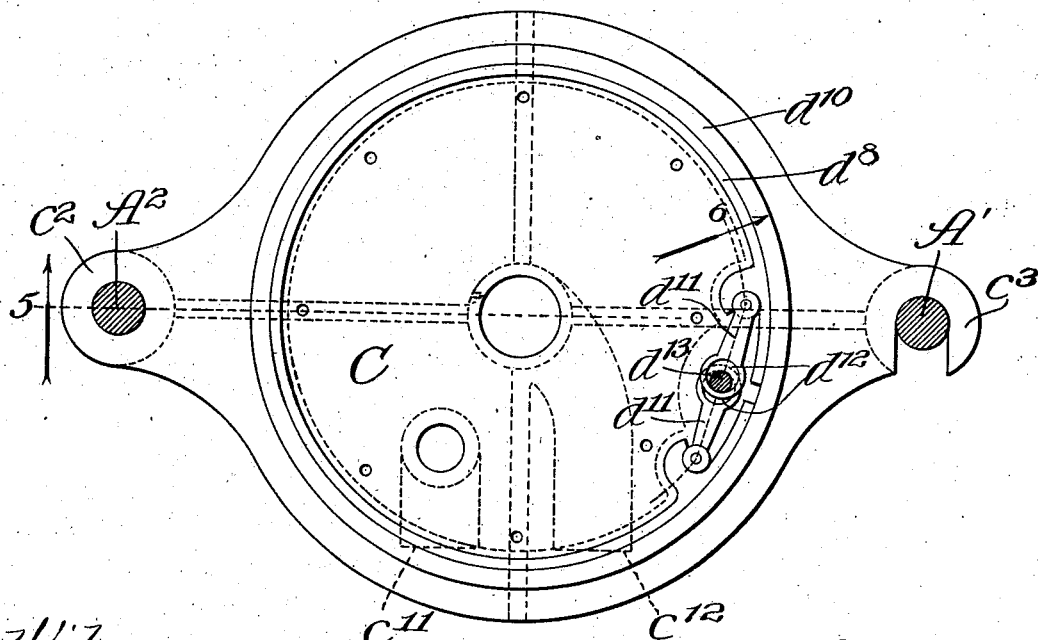

UNITED STATES PATENT OFFICE.

JOHN T. H. PAUL, OF CHICAGO, ILLINOIS, ASSIGNOR TO E. GOLDMAN & COMPANY, A CORPORATION OF ILLINOIS.

FILTER.

No. 827,390.   Specification of Letters Patent.   Patented July 31, 1906.

Application filed January 16, 1906. Serial No. 296,316.

*To all whom it may concern:*

Be it known that I, JOHN T. H. PAUL, a citizen of the United States, residing at Chicago, in the county of Cook and State of Illinois, have invented a new and useful Improvement in Filters, of which the following is a specification.

The present invention is in the nature of an improvement upon the filter described in my pending application, Serial No. 282,757, filed October 14, 1905.

The primary object of my present invention is to provide a filter which may be used either as a compound filter or as two independent filters.

The invention is illustrated in its preferred embodiment in the accompanying drawings, in which—

Figure 1 represents an elevational view of my improved filter; Fig. 2, a sectional elevational view; Fig. 3, a section taken as indicated at line 3 of Fig. 2, showing, however, sections of the filter swung from their normal position to give access to the lower filter-section for removal or insertion of filter-cells; Fig. 4, a plan view of a filter section or member constituting the bottom of the upper filter and the top of the lower filter and showing an expansible packing-ring employed; Fig. 5, a broken vertical section showing more in detail the construction at the central portion of the compound filter; and Fig. 6, a broken section taken, as indicated, at line 6 of Fig. 4 and showing in detail the means for collapsing and expanding the packing-rings employed.

In the construction shown, A represents a base from which rise standards $A'$ $A^2$; B, a lower filter; C, a member constituting a top for the lower filter and a bottom for the upper filter; D, a filter surmounting the member C; and E a top for the upper filter supported on a screw $E'$, depending from a cross-beam $E^2$, connected with the upper ends of the standards $A'$ $A^2$.

The construction of the cells need not be described in detail in the present application, inasmuch as for the purpose of the present invention any desired cell construction may be employed. The cell construction illustrated is the same as that described in my Patent No. 812,517, granted February 13, 1906. In a filter employing cells of this character the liquid enters an annular chamber between the casing and the filter-cells and passing through the filter-cells escapes through a central conduit.

The base A comprises an annular member through which pass inlet and outlet pipes $a$ $a'$, respectively.

The filter B comprises a cylinder $b$, fitted accurately into a base portion $b'$, and cells $b^2$, located within the cylinder and separated therefrom by an annular space $b^3$. The annular space is in communication, through a passage $b^4$, with the inlet-passage $a$, and the cells have a central outlet-conduit $b^5$ in communication with the outlet $a'$.

The member C comprises a disk $c$, adapted to bear on the uppermost cell of the filter B, and a portion $c'$, adapted to support the filter D. The portion $c'$ is equipped with a pivotal lug $c^2$, journaled on the standard $A^2$, and with a hook $c^3$, which engages the standard $A'$. The pivot member $c^2$ is equipped with an integral downwardly-extending sleeve $c^4$, having threaded engagement with a sleeve $c^5$, formed integrally with a pinion $c^6$, actuated by a pinion $c^7$, secured on a horizontal shaft $c^8$. The shaft $c^8$ has a squared outer end for receiving a crank and is journaled in a bracket $c^9$, formed integrally with a ring $c^{10}$, encircling the upper portion of the cylinder $b$. It is obvious that the member C may be independently elevated by means of the mechanism described. The member C is equipped with an inlet-pipe $c^{11}$ and an outlet-pipe $c^{12}$.

The filter D comprises a cylinder $d$, accurately fitted at its base into a ring $d'$, which fits over an upward extension $d^2$ of the member C, and filter-cells $d^3$, between which and the cylinder $d$ is an annular chamber $d^4$. A passage $d^5$ connects the annular chamber with the inlet-pipe $c^{11}$, and the cells have a central conduit $d^6$, which communicates, through a passage $d^7$, with the outlet-pipe $c^{12}$. The member C is equipped at its upper portion with an expansible packing-ring $d^8$, which fits within the lower end of the cylinder $d$, or rather within the ring $d'$, which may be regarded as a portion of the cylinder, and said member C is equipped at its lower portion with an expansible packing-ring $d^9$, which fits within the upper end of the cylinder $b$. The packing-rings are of similar construction, each being provided with an annulus $d^{10}$ of packing material. The ring $d^8$ is shown in Figs. 4 and 6. Each ring has connected with its end portions links $d^{11}$, joined to eccentrics $d^{12}$, carried by shafts $d^{13}$, one of which projects upwardly from the portion $c$ of the member C and the other of which projects downwardly from the portion $c'$ of said member. The shafts are accessible from the exterior, as shown in Fig. 1, and have square ends for receiving a wrench. It is obvious that the packing-rings may be collapsed readily by the means described when it is desired to separate the filter-sections, and it is likewise obvious that they may be expanded to produce tight joints when the filter-sections are assembled. It is convenient to confine the packing-rings by means of plates $d^{14}$ $d^{15}$, as shown in Fig. 5, the passages $d^5$ $d^7$ extending through the plate $d^{14}$, as shown. The cylinder $d$ is equipped with rings $d^{16}$ $d^{17}$, having pivotal portions $d^{18}$ $d^{19}$, respectively, journaled on the standard A', and having hooks $d^{20}$, engaging the standard $A^2$. The pivotal portion $d^{19}$ is equipped with a downwardly-extending sleeve $d^{21}$, having threaded engagement with a sleeve $d^{22}$, formed integrally with a pinion $d^{23}$, journaled on the standard A' and actuated by a pinion $d^{24}$, secured on a shaft $d^{25}$, journaled in a bracket $d^{26}$, carried by the standard A'. By this means the filter D may be independently elevated.

The top E for the cylinder $d$ may be raised through the medium of its screw, which is equipped with actuating means $E^3$ of well-known construction. When the top E is elevated, the cross-beam $E^2$ may be swung on its pivot $e$ in the usual manner.

When it is desired to use the filter as a compound filter, an inlet-hose $f$ is connected with the inlet $c^{11}$ of the upper filter, a hose $f'$ is employed to connect the outlet $c^{12}$ of the upper filter with the inlet $a$ of the lower filter, and a discharge-hose $f^2$ is connected with the outlet-discharge $a'$ of the lower filter. With this arrangement it is obvious liquid will enter the annular chamber of the upper filter, pass through the cells of the upper filter, find an outlet through the central conduit of the upper cells to the pipe $c^{12}$, thence pass through the hose $f'$, enter the annular chamber of the lower filter, thence pass through the cells of the lower filter, and emerge through the central conduit of the lower filter to the hose $f^2$. When it is desired to use the upper and lower filters as independent filters, the hose $f'$ may be disconnected from the pipe $a$ and moved to the position indicated by dotted lines to serve as a discharge-outlet from the upper filter, and a hose $f^3$ may be connected with the inlet-pipe $a$ of the lower filter and serve as an ingress for the liquid to the lower filter. When thus arranged, it is obvious that each filter may be operated independently of the other. When the device is used as a compound filter, it is obvious that the liquid will have to pass through more cells than where the filters are used independently, so that it is possible to suit the filter to the conditions of the liquor being treated and according to the results desired. It is obvious that when the filter-sections are in alinement and properly assembled pressure may be transmitted from the press-screw E' through the cells of the upper filter and the intermediate member C to the cells of the lower filter. The arrangement is designedly such that the filter-sections will swing in alternation in opposite directions—that is, in alternation about the standards A' $A^2$ as pivots—thereby balancing the filter when the sections are swung to opposite positions.

It is to be understood that I have described my invention in detail for clearness of understanding only and without intention of unnecessarily limiting the invention.

What I regard as new, and desire to secure by Letters Patent, is—

1. The combination of a group of alined filter-cells, an inclosing cylinder, a second group of alined filter-cells in alinement with the first group, an inclosing cylinder for the second group, means for transmitting pressure from one group of cells to the other group of cells, and independent inlet and outlet passages for the alined filters thus formed, for the purpose set forth.

2. The combination of a lower filter equipped with ingress and egress passages and provided with a plurality of filter-cells all supplied from the ingress-passage and drained from the egress-passage of the lower filter, a surmounting filter equipped with ingress and egress passages and provided with a plurality of filter-cells all supplied from the ingress-passage and drained from the egress-passage of the surmounting filter, means for transmitting pressure from the cells of the upper filter to the cells of the lower filter, and means for applying pressure to the cells of the upper filter, for the purpose set forth.

3. The combination of a lower filter provided with ingress and egress passages and equipped with a plurality of filter-cells, a surmounting member constituting a base for an upper filter and equipped with means for pressing upon the cells of the lower filter, said member being provided with ingress and egress passages, a surmounting filter equipped with cells in communication with said last-named passages, said surmounting filter bearing upon said member, and means for applying pressure to the upper filter, for the purpose set forth.

4. The combination of a lower filter provided with ingress and egress passages, a surmounting filter having a base fitting slidably within the upper end of the lower filter, said upper filter being provided with ingress and egress passages, means for applying pressure at the upper filter, and means for connecting the egress-passage of one filter with the ingress-passage of the other filter, for the purpose set forth.

5. In means of the character described, the combination of a stationary lower cylinder, filter-cells therein, ingress and egress passages for the filter thus constituted, a top for the stationary cylinder supported on a vertical pivot and equipped with elevating means, a surmounting cylinder supported on a vertical pivot and equipped with elevating means, filter-cells within the last-named cylinder, ingress and egress passages for the filter thus constituted, a top for the last-named filter, and means for applying pressure to said last-named top, for the purpose set forth.

6. In means of the character set forth, the combination of a lower stationary filter, a member supported on a vertical pivot and constituting a top for said filter and a bottom for a superposed filter, means for elevating said member, a surmounting filter supported on said member and having a vertical pivot, means for elevating said surmounting filter, a top for the surmounting filter, and a member supported on a vertical pivot and equipped with means for actuating the top of said surmounting filter, for the purpose set forth.

7. In means of the character set forth, the combination of a stationary filter, standards rising therefrom, a member constituting a top for said filter and a bottom for a surmounting filter, said member being pivoted on one of said standards, elevating means connected with said standard and with the pivotal portion of said member, a surmounting filter pivotally connected with the other of said standards, elevating means for said last-named filter connected with said last-named standard, a top for said last-named filter, and a beam pivotally connected with the same standard as said intermediate member and carrying said top, for the purpose set forth.

8. In means of the character set forth, the combination of a stationary cylinder, cells located therein and forming therewith a filter, ingress and egress passages connected with the base of said filter, a member telescopically connected with the upper portion of said filter and equipped with ingress and egress passages, a surmounting cylinder supported on said member and containing filter-cells constituting therewith a second filter, said second filter having ingress and egress conduits communicating with said last-named ingress and egress passages, a top for said second-named filter, and means for connecting the egress-passage of one filter with the ingress-passage of the other filter, for the purpose set forth.

9. In means of the character set forth, the combination of a stationary filter, a surmounting member telescopically connected therewith and having at one side a vertical pivotal portion, a pinion equipped with a sleeve having threaded connection with said pivotal portion, a surmounting filter equipped at one side with a vertical pivotal portion, a second pinion equipped with a sleeve having threaded connection with the pivotal portion of said second filter, means for actuating said pinion, and a top for said second filter, for the purpose set forth.

10. In means of the character set forth, the combination of a stationary cylinder, a surmounting member equipped with packing-rings, and a surmounting cylinder, said cylinders having telescopic connection with said intermediate member and said packing-rings serving to effect tight joints between the cylinders and the intermediate member, for the purpose set forth.

11. In means of the character set forth, the combination of a stationary cylinder, cells located therein and forming therewith an annular chamber, said cells being provided with a central conduit, an ingress-passage communicating with said annular chamber, an egress-passage communicating with said central conduit, a surmounting member having telescopic connection with the upper end of said cylinder, a surmounting cylinder having at one side a vertical pivot, cells within said last-named cylinder forming therewith an annular chamber, said cells having a central outlet-conduit, ingress and egress passages connected with the intermediate member and in communication with said last-named annular chamber and said last-named central conduit, and a top for said second-named cylinder, for the purpose set forth.

12. In means of the character set forth, the combination of a stationary cylinder, filter-cells contained therein, a surmounting cylinder, filter-cells contained therein, means constituting a top for the lower cylinder and a bottom for the surmounting cylinder, and expansible packing-rings forming tight joints between said last-named means and said cylinders, for the purpose set forth.

JOHN T. H. PAUL.

In presence of—
L. HEISLAR,
J. H. LANDES.